US010946844B2

(12) United States Patent
Atsushi et al.

(10) Patent No.: US 10,946,844 B2
(45) Date of Patent: Mar. 16, 2021

(54) BRAKE HYDRAULIC PRESSURE CONTROL UNIT, BRAKE SYSTEM FOR MOTORCYCLE, AND MOTORCYCLE

(71) Applicant: Robert Bosch GmbH, Stuttgart (DE)

(72) Inventors: Hiroaki Atsushi, Kanagawa (JP); Makoto Sasaki, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 2 days.

(21) Appl. No.: 16/343,481

(22) PCT Filed: Oct. 10, 2017

(86) PCT No.: PCT/IB2017/056239
§ 371 (c)(1),
(2) Date: Apr. 19, 2019

(87) PCT Pub. No.: WO2018/078475
PCT Pub. Date: May 3, 2018

(65) Prior Publication Data
US 2019/0322257 A1    Oct. 24, 2019

(30) Foreign Application Priority Data
Oct. 25, 2016   (JP) .............................. JP2016-208753

(51) Int. Cl.
*B60T 8/32*    (2006.01)
*B60T 8/36*    (2006.01)
(Continued)

(52) U.S. Cl.
CPC ............ *B60T 8/3225* (2013.01); *B60T 8/368* (2013.01); *B60T 8/261* (2013.01); *B60T 8/345* (2013.01);
(Continued)

(58) Field of Classification Search
CPC ........ B60T 8/3225; B60T 8/261; B60T 8/368; B60T 8/4022; B60T 8/176; B60T 8/366;
(Continued)

(56) References Cited

U.S. PATENT DOCUMENTS 5,496,099 A    3/1996  Resch
5,984,429 A    11/1999 Nell et al.
(Continued)

FOREIGN PATENT DOCUMENTS

DE   102005027856    7/2006
EP       1277635     11/2003
(Continued)

OTHER PUBLICATIONS

Translation of JP 2007-276563 obtained on website: https://worldwide.espacenet.com on Jun. 23, 2020.*
International Search Report for Application No. PCT/IB2017/056239 dated Jan. 16, 2018 (English Translation, 3 pages).

*Primary Examiner* — Pamela Rodriguez
(74) *Attorney, Agent, or Firm* — Michael Best & Friedrich LLP (57) ABSTRACT

A brake hydraulic pressure control unit capable of improving mountability of a brake system on a motorcycle is obtained. In addition, a brake system for a motorcycle including such a brake hydraulic pressure control unit and a motorcycle are obtained. In the brake hydraulic pressure control unit of the brake system for a motorcycle, an inlet valve, an outlet valve, and a pump in one of hydraulic circuits as a boost-type hydraulic circuit and a first valve and a second valve in the hydraulic circuit are separately provided in a primary base body and a secondary base body. The primary base body and the secondary base body are separated from each other.

13 Claims, 4 Drawing Sheets (51) Int. Cl.
  *B60T 8/26* (2006.01)
  *B60T 8/34* (2006.01)
  *B60T 8/50* (2006.01)
  *B62L 3/08* (2006.01)

(52) U.S. Cl.
  CPC ............. *B60T 8/363* (2013.01); *B60T 8/5031* (2013.01); *B62L 3/08* (2013.01)

(58) Field of Classification Search
  CPC .... B60T 8/3645; B60T 8/1706; B60T 8/3685; B60T 7/085; B60T 7/042; B60T 8/345; B60T 8/363; B60T 8/5031; F16K 27/048; B62L 3/08
  USPC .................. 303/9.64, 9.61, 9.69; 188/349
  See application file for complete search history.

(56) References Cited

U.S. PATENT DOCUMENTS

| | | | |
|---|---|---|---|
| 6,273,523 | B1 * | 8/2001 | Wakabayashi .......... B60T 8/261 188/349 |
| 6,793,295 | B2 * | 9/2004 | Sakamoto ............. B60T 8/1706 303/9.61 |
| 2002/0125764 | A1 | 9/2002 | Sakamoto |
| 2008/0106145 | A1 | 5/2008 | Hinz et al. |
| 2015/0246663 | A1 * | 9/2015 | Sagayama ................. F04B 9/04 303/10 |
| 2018/0170333 | A1 * | 6/2018 | Sagayama ............. B60T 8/3675 |
| 2020/0063881 | A1 * | 2/2020 | Sagayama ............... B60T 7/042 |

FOREIGN PATENT DOCUMENTS

| | | |
|---|---|---|
| JP | 2007276563 | 10/2007 |
| WO | 9116221 | 10/1991 |

* cited by examiner

BRAKE HYDRAULIC PRESSURE CONTROL UNIT, BRAKE SYSTEM FOR MOTORCYCLE, AND MOTORCYCLE

BACKGROUND OF THE INVENTION

The invention relates to a brake hydraulic pressure control unit of a brake system for a motorcycle, a brake system for a motorcycle including the brake hydraulic pressure control unit, and a motorcycle including the brake system for a motorcycle.

As a conventional motorcycle (a two-wheeled motor vehicle or a three-wheeled motor vehicle), a motorcycle that includes a brake system provided with: a first hydraulic circuit that acts on a front wheel of the motorcycle; and a second hydraulic circuit that acts on a rear wheel of the motorcycle is available. Each of the first hydraulic circuit and the second hydraulic circuit includes: a primary channel that communicates between a master cylinder and a wheel cylinder; and a secondary channel that releases a brake fluid in the wheel cylinder to an intermediate section of the primary channel by driving a pump. At least one hydraulic circuit of the first hydraulic circuit and the second hydraulic circuit is a boost-type hydraulic circuit capable of boosting a pressure of the brake fluid in the wheel cylinder by driving the pump, and includes a supply channel through which the brake fluid in the master cylinder is supplied to a suction side of the pump.

A brake hydraulic pressure control unit is configured by including: an inlet valve provided in each of the primary channel of the first hydraulic circuit and the primary channel of the second hydraulic circuit; an outlet valve provided in each of the secondary channel of the first hydraulic circuit and the secondary channel of the second hydraulic circuit; a first valve provided on the master cylinder side of the intermediate section of the primary channel in the hydraulic circuit as the boost-type hydraulic circuit; a second valve provided in the supply channel; and a base body provided with those components (for example, see JP-A-2007-276563).

SUMMARY OF THE INVENTION

In the above-described brake hydraulic pressure control unit, the inlet valves and the outlet valves in the first hydraulic circuit and the second hydraulic circuit as well as the first valve and the second valve in the hydraulic circuit as the boost-type hydraulic circuit are provided in the single base body. Differing from other vehicles, strict restriction on a mounting space is particularly imposed on the motorcycle. In addition, the base body is enlarged by being added with a configuration that realizes the boost-type hydraulic circuit. In order to mount the base body on the motorcycle in such a situation, a large space has to be secured in a body of the motorcycle. In other words, the above-described brake hydraulic pressure control unit has such a problem that mountability of the brake system on the motorcycle is low.

The invention has been made with the above-described problem as the background and therefore obtains a brake hydraulic pressure control unit capable of improving mountability of a brake system on a motorcycle. The invention also obtains a brake system for a motorcycle that includes such a brake hydraulic pressure control unit. The invention further obtains a motorcycle that includes such a brake system for a motorcycle.

A brake hydraulic pressure control unit according to the invention is a brake hydraulic pressure control unit of a brake system for a motorcycle. The brake system includes: a first hydraulic circuit acting on a front wheel of the motorcycle; and a second hydraulic circuit acting on a rear wheel of the motorcycle. Each of the first hydraulic circuit and the second hydraulic circuit includes: a primary channel communicating between a master cylinder and a wheel cylinder; and a secondary channel releasing a brake fluid in the wheel cylinder to an intermediate section of the primary channel by driving a pump. One hydraulic circuit of the first hydraulic circuit and the second hydraulic circuit is a boost-type hydraulic circuit capable of boosting a pressure of the brake fluid in the wheel cylinder by driving the pump, and includes a supply channel through which the brake fluid in the master cylinder is supplied to a suction side of the pump in the secondary channel. The brake hydraulic pressure control unit includes: an inlet valve provided in the primary channel; an outlet valve provided in the secondary channel; a first valve provided on the master cylinder side of the intermediate section in the primary channel in the one hydraulic circuit; and a second valve provided in the supply channel in the one hydraulic circuit. The inlet valve, the outlet valve, and the pump in the one hydraulic circuit and the first valve and the second valve in the one hydraulic circuit are separately provided in a primary base body and a secondary base body. The primary base body and the secondary base body are separated from each other.

A brake system for a motorcycle according to the invention includes a brake hydraulic pressure control unit as described above.

A motorcycle according to the invention includes the brake system for a motorcycle as described above.

In the brake hydraulic pressure control unit according to the invention, the inlet valve and the outlet valve in the hydraulic circuit as the boost-type hydraulic circuit and the first valve and the second valve in the hydraulic circuit are separately provided in the primary base body and the secondary base body, which are separated from each other. In the case where members are collectively provided in a single base body, a large number of the channels have to be formed in complicated routes in the base body, and a large outer area has to be secured for attachment of the large number of the members. Thus, the brake hydraulic pressure control unit can only be downsized to a certain extent. On the contrary, in the case where the members are separately provided in the primary base body and the secondary base body, which are separated from each other, each of the base bodies can be downsized in a situation where restrictions on the routes of the channels and securing the outer area are relaxed. Thus, the brake hydraulic pressure control unit can further be downsized. For this reason, necessity of securing a large space in the motorcycle is reduced, and mountability of the brake system on the motorcycle is improved. Furthermore, the primary base body can be used as a base body of a case where neither the first hydraulic circuit nor the second hydraulic circuit is the boost-type hydraulic circuit. Thus, manufacturing cost and the like can be cut.

DETAILED DESCRIPTION

A description will hereinafter be made on a brake hydraulic pressure control unit, a brake system, and a motorcycle according to the invention by using the drawings.

Noted that each of a configuration, an operation, and the like, which will be described below, is merely one example, and the brake hydraulic pressure control unit, the brake system, and the motorcycle according to the invention are not limited to a case with such a configuration, such an operation, and the like. There is a case where the same or similar members or portions are denoted by the same reference sign in each of the drawings. In addition, a detailed structure will appropriately be depicted in a simplified manner or will not be depicted.

A description will hereinafter be made on a brake system according to an embodiment.

<Configuration and Operation of Brake System>

A description will be made on a configuration and an operation of the brake system according to the embodiment.

Figure 1:
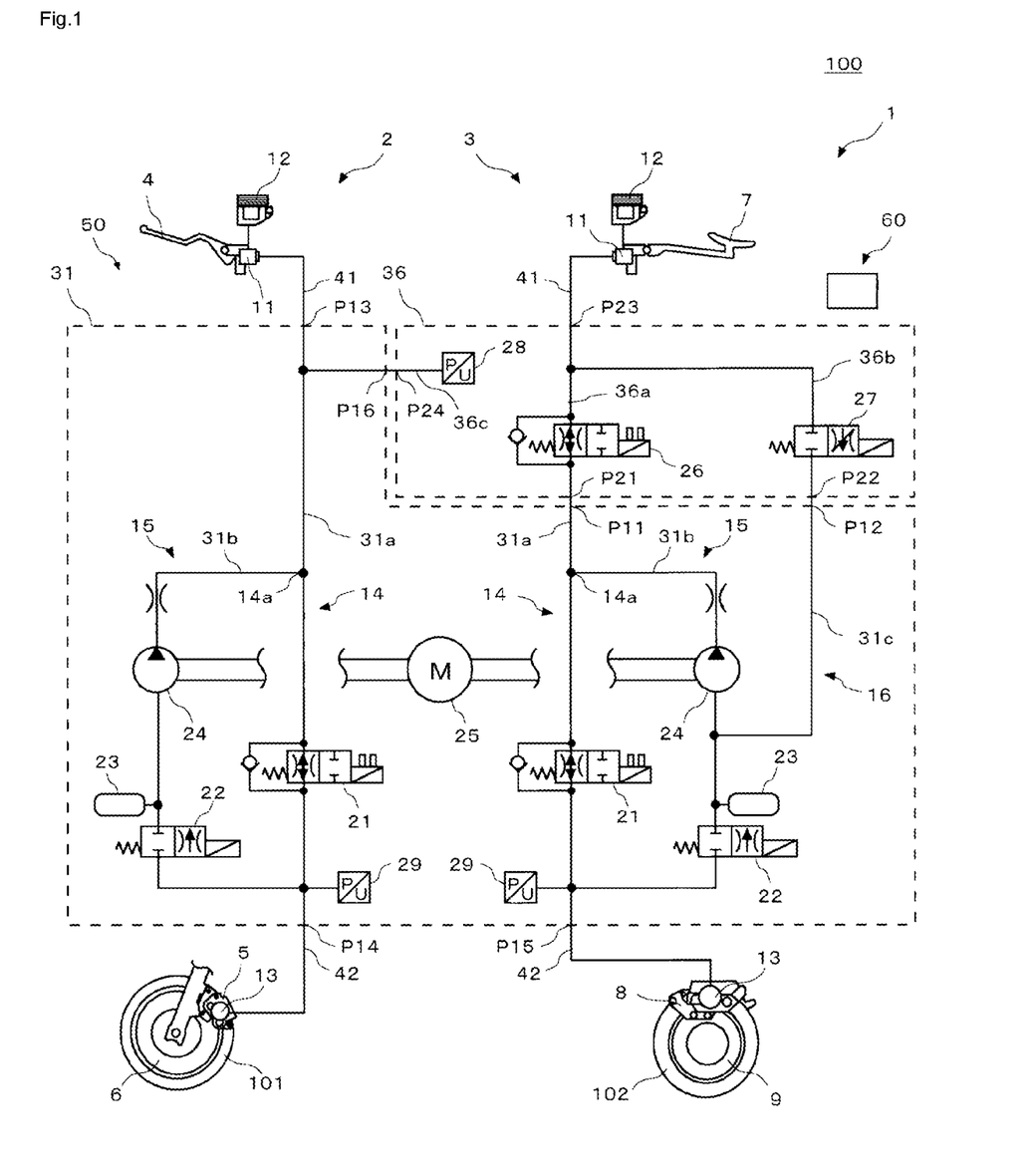
FIG. 1 is a system configuration diagram of a brake system according to an embodiment of the invention.

FIG. 1 is a system configuration diagram of the brake system according to the embodiment of the invention.

As depicted in FIG. 1, a brake system 1 is mounted on a motorcycle 100 (a two-wheeled motor vehicle or a three-wheeled motor vehicle), and includes: a first hydraulic circuit 2 that acts on a front wheel 101 of the motorcycle 100; and a second hydraulic circuit 3 that acts on a rear wheel 102 of the motorcycle 100. The first hydraulic circuit 2 and the second hydraulic circuit 3 are filled with a brake fluid.

A piston (not depicted), which reciprocates in an interlocking manner with a handlebar lever 4, is installed in a master cylinder 11 of the first hydraulic circuit 2. A reservoir 12 is attached to the master cylinder 11. A wheel cylinder 13 of the first hydraulic circuit 2 is provided in a front brake caliper 5. When a pressure of the brake fluid in the wheel cylinder 13 is boosted, a brake pad (not depicted) of the front brake caliper 5 is pressed against a front rotor 6 that rotates with the front wheel 101, and the front wheel 101 is thereby braked.

A piston (not depicted), which reciprocates in an interlocking manner with a foot pedal 7, is installed in the master cylinder 11 of the second hydraulic circuit 3. The reservoir 12 is attached to the master cylinder 11. The wheel cylinder 13 of the second hydraulic circuit 3 is provided in a rear brake caliper 8. When a pressure of the brake fluid in the wheel cylinder 13 is boosted, a brake pad (not depicted) of the rear brake caliper 8 is pressed against a rear rotor 9 that rotates with the rear wheel 102, and the rear wheel 102 is thereby braked.

The first hydraulic circuit 2 and the second hydraulic circuit 3 each include a primary channel 14 and a secondary channel 15. The primary channel 14 communicates between the master cylinder 11 and the wheel cylinder 13. An inlet valve 21 is provided in the primary channel 14. The secondary channel 15 communicates between a portion on the wheel cylinder 13 side of the primary channel 14 from the inlet valve 21 and a portion on the master cylinder 11 side of the primary channel 14 from the inlet valve 21 via an outlet valve 22. The inlet valve 21 is an electromagnetic valve that is opened in an unenergized state and is closed in an energized state, for example. The outlet valve 22 is an electromagnetic valve that is closed in the unenergized state and is opened in the energized state, for example. On a downstream side of the outlet valve 22 in the secondary channel 15, an accumulator 23 and a pump 24 are provided in this order. The pump 24 is driven by a motor 25. When the pump 24 is driven, the brake fluid in the wheel cylinder 13 is released to an intermediate section 14a of the primary channel 14 via the secondary channel 15.

Of the first hydraulic circuit 2 and the second hydraulic circuit 3, only the second hydraulic circuit 3 is a boost-type hydraulic circuit capable of boosting the pressure of the brake fluid in the wheel cylinder 13 by driving the pump 24. The second hydraulic circuit 3 includes a supply channel 16 through which the brake fluid in the master cylinder 11 is supplied to a suction side of the pump 24 in the secondary channel 15. In the primary channel 14 of the second hydraulic circuit 3, a first valve 26 is provided on the master cylinder 11 side of the intermediate section 14a. A second valve 27 is provided in the supply channel 16 of the second hydraulic circuit 3. The first valve 26 is an electromagnetic valve that is opened in the unenergized state and is closed in the energized state, for example. The second valve 27 is an electromagnetic valve that is closed in the unenergized state and is opened in the energized state, for example. The second hydraulic circuit 3 corresponds to the "one hydraulic circuit" in the invention, and the first hydraulic circuit 2 corresponds to the "other hydraulic circuit" in the invention.

The inlet valves 21, the outlet valves 22, the accumulators 23, the pumps 24, and the motor 25 in the first hydraulic circuit 2 and the second hydraulic circuit 3 are provided in a primary base body 31 that is formed with: a partial channel 31a that constitutes a part of the primary channel 14 in each of the first hydraulic circuit 2 and the second hydraulic circuit 3; and a partial channel 31b that constitutes the secondary channel 15 in each of the first hydraulic circuit 2 and the second hydraulic circuit 3 therein. In addition, the first valve 26 and the second valve 27 in the second hydraulic circuit 3 are provided in a secondary base body 36 that is formed with: a partial channel 36a that constitutes a part of the primary channel 14 in the second hydraulic circuit 3; and a partial channel 36b that constitutes a part of the supply channel 16 in the second hydraulic circuit 3 therein.

A port P11 of the partial channel 31a, which constitutes the part of the primary channel 14 in the second hydraulic circuit 3 and is one of the partial channels formed in the primary base body 31, and a port P21 of the partial channel 36a, which constitutes the part of the primary channel 14 in the second hydraulic circuit 3 and is one of the partial channels formed in the secondary base body 36, are connected directly, that is, without interposing a brake fluid pipe therebetween. A part of the partial channel 31a, which constitutes the part of the primary channel 14 in the second hydraulic circuit 3 and is one of the partial channels formed in the primary base body 31, corresponds to the "first partial channel" in the invention. A part of the partial channel 36a, which constitutes the part of the primary channel 14 in the second hydraulic circuit 3 and is one of the partial channels formed in the secondary base body 36, corresponds to the "second partial channel" in the invention.

The primary base body 31 is formed with a partial channel 31c that constitutes a part of the supply channel 16 in the second hydraulic circuit 3, and a port P12 of the partial channel 31c and a port P22 of the partial channel 36b, which constitutes the part of the supply channel 16 in the second hydraulic circuit 3 and is one of the partial channels formed in the secondary base body 36, are connected directly, that is, without interposing the brake fluid pipe therebetween. A part of the partial channel 31*c*, which constitutes the part of the supply channel 16 in the second hydraulic circuit 3 and is one of the partial channels formed in the primary base body 31, corresponds to the "third partial channel" in the invention. A part of the partial channel 36*b*, which constitutes the part of the supply channel 16 in the second hydraulic circuit 3 and is one of the partial channels formed in the secondary base body 36, corresponds to the "fourth partial channel" in the invention.

A brake fluid pipe 41 from the master cylinder 11 is connected to a port P13 of the partial channel 31*a* of the primary channel 14 in the first hydraulic circuit 2, the partial channel 31*a* being one of the partial channels formed in the primary base body 31. A brake fluid pipe 42 from the wheel cylinder 13 is connected to a port P14 of the partial channel 31*a*. The brake fluid pipe 41 from the master cylinder 11 is connected to a port P23 of the partial channel 36*a* of the primary channel 14 in the second hydraulic circuit 3, the partial channel 36*a* being one of the partial channels formed in the secondary base body 36. The brake fluid pipe 42 from the wheel cylinder 13 is connected to a port P15 of the partial channel 31*a* of the primary channel 14 in the second hydraulic circuit 3, the partial channel 31*a* being one of the partial channels formed in the primary base body 31. The primary base body 31 is formed with the intermediate section 14*a* of the primary channel 14 in each of the first hydraulic circuit 2 and the second hydraulic circuit 3, a downstream-side end of the secondary channel 15 being connected to the intermediate section 14*a*.

The first hydraulic circuit 2 is provided with a master cylinder hydraulic pressure sensor 28 that detects a pressure of the brake fluid in the master cylinder 11. In addition, the first hydraulic circuit 2 and the second hydraulic circuit 3 are each provided with a wheel cylinder hydraulic pressure sensor 29 that detects the pressure of the brake fluid in the wheel cylinder 13. The wheel cylinder hydraulic pressure sensors 29 are provided in the primary base body 31, and the master cylinder hydraulic pressure sensor 28 is provided in the secondary base body 36.

A port P16 of the partial channel 31*a* of the primary channel 14 in the first hydraulic circuit 2 and a port P24 of a partial channel 36*c* of the primary channel 14 in the first hydraulic circuit 2 are connected directly, that is, without interposing the brake fluid pipe therebetween, the partial channel 31*a* being one of the partial channels formed in the primary base body 31, and the partial channel 36*c* being one of the partial channels formed in the secondary base body 36.

A brake hydraulic pressure control unit 50 is configured by at least including the primary base body 31, the secondary base body 36, each member provided therein, and a control device 60. In the brake hydraulic pressure control unit 50, when the control device 60 controls operations of the inlet valves 21, the outlet valves 22, the first valve 26, and the second valve 27 and an operation of the motor 25, the pressures of the brake fluids in the wheel cylinders 13 are controlled.

The control device 60 may be one controller or may be divided into plural controllers. For example, the control device 60 may be divided into a controller that controls the members provided in the primary base body 31 and a controller that controls the members provided in the secondary base body 36. In addition, the control device 60 may entirely or partially be attached to the primary base body 31, the secondary base body 36, or the like, or may be attached to another member. Furthermore, the control device 60 may entirely or partially be constructed of a microcomputer, a microprocessor unit, or the like, may be constructed of a member in which firmware and the like can be updated, or may be a program module or the like that is executed by a command from a CPU or the like, for example.

The control device 60 executes the following hydraulic pressure control operation, for example.

In the case where locking or possible locking of a wheel (the front wheel 101, the rear wheel 102) of the motorcycle 100 is detected when the handlebar lever 4 or the foot pedal 7 of the motorcycle 100 is operated in a normal state, that is, in a state where the inlet valve 21, the outlet valve 22, the first valve 26, and the second valve 27 are in the unenergized states, the control device 60 initiates anti-lock brake control of the wheel.

Once initiating the anti-lock brake control, the control device 60 brings the inlet valve 21 into the energized state and blocks the primary channel 14, so as to restrict a flow of the brake fluid from the master cylinder 11 to the wheel cylinder 13. In addition, the control device 60 brings the outlet valve 22 into the energized state and opens the secondary channel 15, so as to allow a flow of the brake fluid from the wheel cylinder 13 to the accumulator 23. Furthermore, the control device 60 drives the motor 25, so as to allow a back flow of the brake fluid that is stored in the accumulator 23 to the primary channel 14.

When cancellation of locking or avoidance of locking of the wheel (the front wheel 101, the rear wheel 102) of the motorcycle 100 is detected, the control device 60 brings the inlet valve 21 and the outlet valve 22 into the unenergized states and stops driving the pump 24, so as to terminate the anti-lock brake control.

In the case where it is determined that, in addition to the front wheel 101, the rear wheel 102 has to be braked when only the handlebar lever 4 of the motorcycle 100 is operated, the control device 60 brings the first valve 26 and the second valve 27 in the second hydraulic circuit 3 into the energized states and opens the supply channel 16 in the second hydraulic circuit 3, so as to allow a flow of the brake fluid between the master cylinder 11 and the suction side of the pump 24 in the second hydraulic circuit 3. In addition, the control device 60 drives the motor 25 to boost the pressure of the brake fluid in the wheel cylinder 13 in the second hydraulic circuit 3. At the time, the control device 60 optimizes an operation parameter of the motor 25 and the like on the basis of detection signals of the master cylinder hydraulic pressure sensor 28 in the first hydraulic circuit 2, the wheel cylinder hydraulic pressure sensor 29 in the second hydraulic circuit 3, and the like. In this way, a braking force on the rear wheel 102 is adjusted.

<Assembled State of Each Member of Brake Hydraulic Pressure Control Unit>

A description will be made on an assembled state of each of the members of the brake hydraulic pressure control unit in the brake system according to the embodiment.

Figure 2:
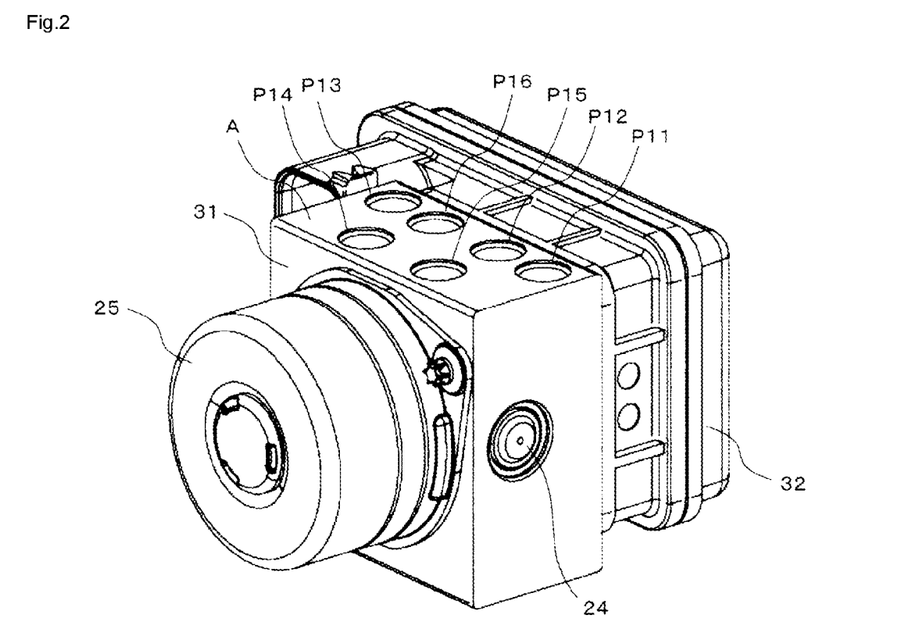
FIG. 2 is an image of a primary base body and members provided therein of the brake system according to the embodiment of the invention.
Figure 3:
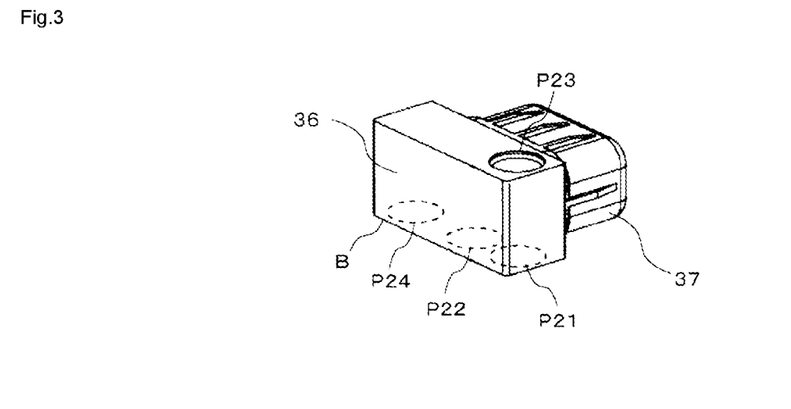
FIG. 3 is an image of a secondary base body and members provided therein of the brake system according to the embodiment of the invention.

FIG. 2 is an image of the primary base body and the members provided therein of the brake system according to the embodiment of the invention. FIG. 3 is an image of the secondary base body and the members provided therein of the brake system according to the embodiment of the invention.

As depicted in FIG. 2, the primary base body 31 is a substantially rectangular-parallelepiped block that is made of aluminum, or the like. The ports P11, P12, P13, P14, P15, P16 are preferably formed on the same surface (a surface A) of the primary base body 31. The inlet valves 21, the outlet valves 22, and the wheel cylinder hydraulic pressure sensors 29 in the first hydraulic circuit 2 and the second hydraulic circuit 3 are attached to a surface of the primary base body 31 to which a primary base body casing 32 is attached, and are covered with the primary base body casing 32.

As depicted in FIG. 3, the secondary base body 36 is a substantially rectangular-parallelepiped block that is made of aluminum, or the like. The ports P21, P22, P24 are preferably formed on the same surface (a surface B) of the secondary base body 36. The first valve 26 and the second valve 27 in the second hydraulic circuit 3 and the master cylinder hydraulic pressure sensor 28 in the first hydraulic circuit 2 are attached to a surface of the secondary base body 36 to which a secondary base body casing 37 is attached, and are covered with the secondary base body casing 37.

The secondary base body 36 is attached to the primary base body 31 such that the ports P21, P22, P24 of the secondary base body 36 are coupled to the ports P11, P12, P16 of the primary base body 31. The ports P11, P12, P16 of the primary base body 31 and the ports P21, P22, P24 of the secondary base body 36 preferably include a coupling structure capable of encapsulating the brake fluid.

<Mounted State of Brake Hydraulic Pressure Control Unit on Motorcycle>

A description will be made on a mounted state of the brake hydraulic pressure control unit of the brake system according to the embodiment on the motorcycle.

Figure 4:
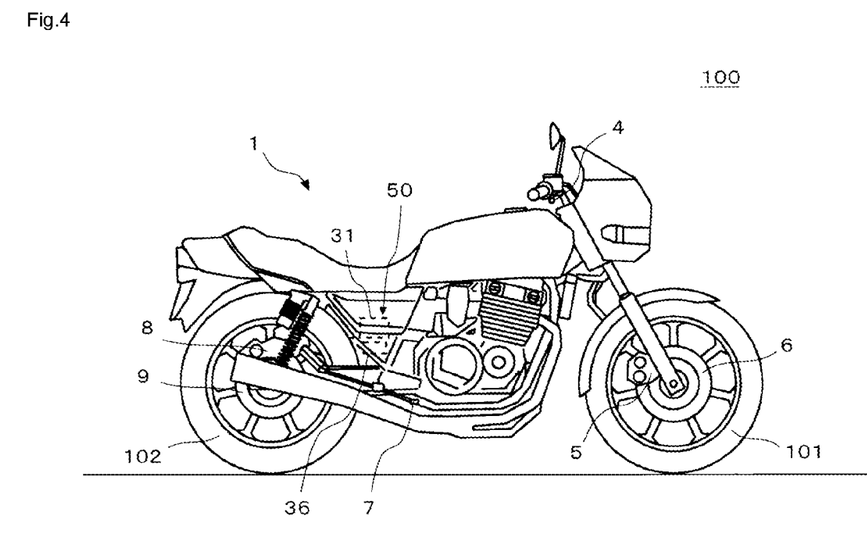
FIG. 4 is view of a mounted state of a brake hydraulic pressure control unit of the brake system according to the embodiment of the invention on a motorcycle.

FIG. 4 is a view of the mounted state of the brake hydraulic pressure control unit of the brake system according to the embodiment of the invention on the motorcycle.

As depicted in FIG. 4, the primary base body 31 and the secondary base body 36 are disposed such that the secondary base body 36 is located closer to the foot pedal 7 of the motorcycle 100 in comparison with the primary base body 31.

<Effects of Brake System>

A description will be made on effects of the brake system according to the embodiment.

In the brake hydraulic pressure control unit 50 of the brake system 1, the inlet valve 21, the outlet valve 22, and the pump 24 in the hydraulic circuit (the second hydraulic circuit 3) as the boost-type hydraulic circuit and the first valve 26 and the second valve 27 in the hydraulic circuit (the second hydraulic circuit 3) are separately provided in the primary base body 31 and the secondary base body 36, which are separated from each other. In the case where the members are collectively provided in the single base body, a large number of the channels have to be formed in complicated routes in the base body, and a large outer area has to be secured for attachment of the large number of the members. Thus, the brake hydraulic pressure control unit 50 can only be downsized to a certain extent. On the contrary, in the case where the members are separately provided in the primary base body 31 and the secondary base body 36, which are separated from each other, each of the base bodies can be downsized in a situation where restrictions on the routes of the channels and securing the outer area are relaxed. Thus, the brake hydraulic pressure control unit 50 can further be downsized. For this reason, necessity of securing a large space in the motorcycle 100 is reduced, and mountability of the brake system 1 on the motorcycle 100 is improved. Furthermore, the primary base body 31 can also be used as a base body of a case where none of the hydraulic circuits (the first hydraulic circuit 2, the second hydraulic circuit 3) is the boost-type hydraulic circuit. Therefore, manufacturing cost and the like can be cut.

Preferably, in the brake hydraulic pressure control unit 50 of the brake system 1, the intermediate section 14a of the primary channel 14 in the hydraulic circuit (the second hydraulic circuit 3) as the boost-type hydraulic circuit is formed not in the secondary base body 36 but in the primary base body 31. Thus, the primary base body 31 and the secondary base body 36 can further be downsized by reducing the number of the ports to be provided in the primary base body 31 and the secondary base body 36. In this way, the mountability of the brake system 1 on the motorcycle 100 is further improved.

In particular, in the brake hydraulic pressure control unit 50 of the brake system 1, the intermediate section 14a of the primary channel 14 and the first valve 26 in the hydraulic circuit (the second hydraulic circuit 3) thereof are preferably coupled to each other via the partial channel 31a formed in the primary base body 31 and the partial channel 36a formed in the secondary base body 36. The suction side of the pump 24 in the secondary channel 15 and the second valve 27 in the supply channel 16 of the hydraulic circuit (the second hydraulic circuit 3) are preferably coupled to each other via the partial channel 31c formed in the primary base body 31 and the partial channel 36b formed in the secondary base body 36. The partial channel 31a is preferably connected directly to the partial channel 36a. The partial channel 31c is preferably connected directly to the partial channel 36b. With such a configuration, because the primary base body 31 and the secondary base body 36 are separated from each other, an increase in the number of components of the brake system 1 is suppressed.

Preferably, in the brake hydraulic pressure control unit 50 of the brake system 1, only one (the second hydraulic circuit 3) of the hydraulic circuits is the boost-type hydraulic circuit, and the master cylinder hydraulic pressure sensor 28 of the other hydraulic circuit (the first hydraulic circuit 2) is provided in the secondary base body 36. Thus, in the case where none of the hydraulic circuits (the first hydraulic circuit 2, the second hydraulic circuit 3) is the boost-type hydraulic circuit, necessity of adding plural base bodies to the base body so as to allow an interlocking brake operation of boosting the pressure of the brake fluid in the wheel cylinder 13 in the one hydraulic circuit (the second hydraulic circuit 3) in accordance with the operation input in the other hydraulic circuit (the first hydraulic circuit 2) is reduced. Therefore, assemblability of the brake system 1 is improved.

In particular, the inlet valves 21, the outlet valves 22, and the pumps 24 of both of the hydraulic circuits (the first hydraulic circuit 2, the second hydraulic circuit 3) are preferably provided in the primary base body 31. With such a configuration, the assemblability of the brake system 1 is further improved.

Preferably, in the brake hydraulic pressure control unit 50 of the brake system 1, only the second hydraulic circuit 3 is the boost-type hydraulic circuit. Thus, while operation feeling of the handlebar lever 4 by a user is secured, the brake hydraulic pressure control unit 50 can be downsized. Therefore, the mountability of the brake system 1 on the motorcycle 100 is further improved.

In particular, the master cylinder 11 in the second hydraulic circuit 3 preferably receives the operation of the foot pedal 7 of the motorcycle 100, and the secondary base body 36 is preferably disposed closer to the foot pedal 7 in comparison with the primary base body 31. With such a configuration, unnecessary extension of routing length of the brake fluid pipe 41 is suppressed.

Modified Example—1

Figure 5:
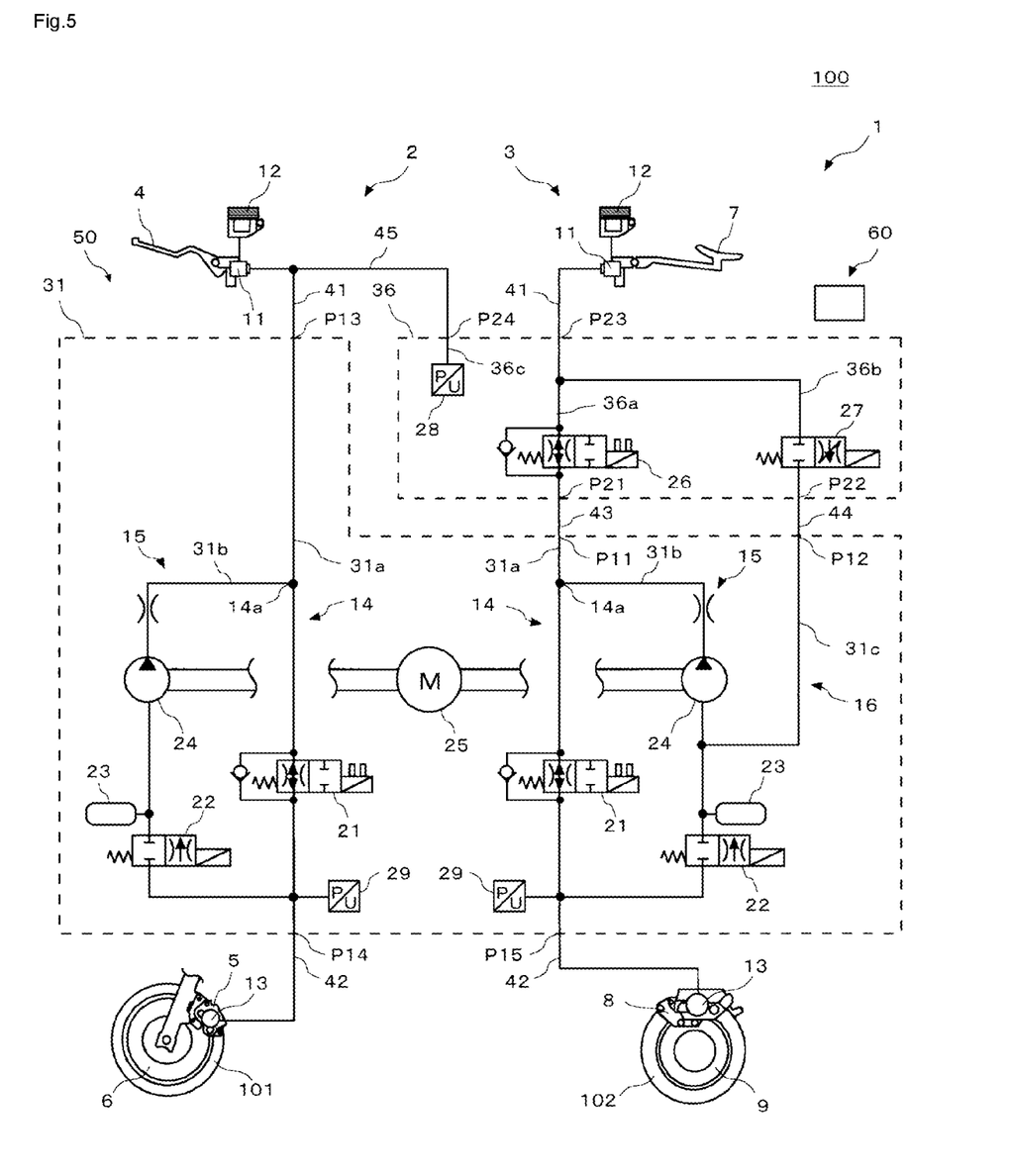
FIG. 5 is a system configuration diagram of a modified example of the brake system according to the embodiment of the invention.

FIG. 5 is a system configuration diagram of a modified example of the brake system according to the embodiment of the invention.

As depicted in FIG. 5, the port P11 of the partial channel 31a of the primary channel 14 in the second hydraulic circuit 3 is connected to the port P21 of the partial channel 36a of the primary channel 14 in the second hydraulic circuit 3 via a brake fluid pipe 43, the partial channel 31a being one of the partial channels formed in the primary base body 31, and the partial channel 36a being one of the partial channels formed in the secondary base body 36. In addition, the port P12 of the partial channel 31c of the supply channel 16 in the second hydraulic circuit 3 is connected to the port P22 of the partial channel 36b of the supply channel 16 in the second hydraulic circuit 3 via a brake fluid pipe 44, the partial channel 31c being one of the partial channels formed in the primary base body 31, and the partial channel 36b being one of the partial channels formed in the secondary base body 36. Furthermore, the port P24 of the partial channel 36c of the primary channel 14 in the first hydraulic circuit 2 is connected to the brake fluid pipe 41 via a brake fluid pipe 45, the partial channel 36c being one of the partial channels formed in the secondary base body 36. The brake fluid pipe 43 corresponds to the "first brake fluid pipe" in the invention, and the brake fluid pipe 44 corresponds to the "second brake fluid pipe" in the invention.

With such a configuration, the primary base body 31 and the secondary base body 36 can be disposed in relatively small separated spaces of the motorcycle 100. For this reason, the necessity of securing the large space in the motorcycle 100 is further reduced, and the mountability of the brake system 1 on the motorcycle 100 is further improved. Also, in such a case, the secondary base body 36 is preferably disposed closer to the foot pedal 7 in comparison with the primary base body 31. With such a configuration, the unnecessary extension of the routing length of the brake fluid pipe 41 is suppressed.

Modified Example—2

Of the first hydraulic circuit 2 and the second hydraulic circuit 3, only the first hydraulic circuit 2 may be the boost-type hydraulic circuit capable of boosting the pressure of the brake fluid in the wheel cylinder 13 by driving the pump 24. In such a case, the first hydraulic circuit 2 corresponds to the "one hydraulic circuit" in the invention, and the second hydraulic circuit 3 corresponds to the "other hydraulic circuit" in the invention.

Alternatively, both of the first hydraulic circuit 2 and the second hydraulic circuit 3 may be the boost-type hydraulic circuits capable of boosting the pressures of the brake fluids in the wheel cylinders 13 by driving the pumps 24. In such a case, either one of the first hydraulic circuit 2 and the second hydraulic circuit 3 corresponds to the "one hydraulic circuit" in the invention. The first valve 26 and the second valve 27 in the first hydraulic circuit 2 and the first valve 26 and the second valve 27 in the second hydraulic circuit 3 may collectively be provided in the one secondary base body 36 or may separately be provided in the two secondary base bodies 36.

The description has been made so far on the embodiment. However, the invention is not limited to the described embodiment. For example, in the invention, only a part of the described embodiment may be implemented.

REFERENCE SIGNS LIST

1: Brake system
2: First hydraulic circuit
3: Second hydraulic circuit
4: Handlebar lever
5: Front brake caliper
6: Front rotor
7: Foot pedal
8: Rear brake caliper
9: Rear rotor
11: Master cylinder
12: Reservoir
13: Wheel cylinder
14: Primary channel
14a: Intermediate section
15: Secondary channel
16: Supply channel
21: Inlet valve
22: Outlet valve
23: Accumulator
24: Pump
25: Motor
26: First valve
27: Second valve
28: Master cylinder hydraulic pressure sensor
29: Wheel cylinder hydraulic pressure sensor
31: Primary base body
31a, 31b, 31c: Partial channel
32: Primary base body casing
36: Secondary base body
36a, 36b, 36c: Partial channel
37: Secondary base body casing
41, 42, 43, 44, 45: Brake fluid pipe
50: Brake hydraulic pressure control unit
60: Control device
100: Motorcycle
101: Front wheel
102: Rear wheel
P11, P12, P13, P14, P15, P16, P21, P22, P23, P24: Port

The invention claimed is:

1. A brake hydraulic pressure control unit of a brake system for a motorcycle,
the brake system including:
a first hydraulic circuit acting on a front wheel of the motorcycle; and
a second hydraulic circuit acting on a rear wheel of the motorcycle,
the first hydraulic circuit including:
a primary channel communicating between a master cylinder of the first hydraulic circuit and a wheel cylinder of the first hydraulic circuit; and
a secondary channel releasing a brake fluid in the wheel cylinder of the first hydraulic circuit to an intermediate section of the primary channel of the first hydraulic circuit by driving a pump,
the second hydraulic circuit including:
a primary channel communicating between a master cylinder of the second hydraulic circuit and a wheel cylinder of the second hydraulic circuit; and
a secondary channel releasing a brake fluid in the wheel cylinder of the second hydraulic circuit to an intermediate section of the primary channel of the second hydraulic circuit by driving a pump, and one hydraulic circuit of the first hydraulic circuit and the second hydraulic circuit being a boost-type hydraulic circuit capable of boosting a pressure of the brake fluid in the wheel cylinder by driving the pump, and including a supply channel through which the brake fluid in the master cylinder is supplied to a suction side of the pump in the secondary channel, the brake hydraulic pressure control unit comprising:

an inlet valve provided in the primary channel of the first hydraulic circuit;

an inlet valve provided in the primary channel of the second hydraulic circuit;

an outlet valve provided in the secondary channel of the first hydraulic circuit;

an outlet valve provided in the secondary channel of the second hydraulic circuit;

a first valve provided on the master cylinder side of the intermediate section of the primary channel in the one hydraulic circuit; and a second valve provided in the supply channel in the one hydraulic circuit, wherein the inlet valve, the outlet valve, and the pump in the one hydraulic circuit and the first valve and the second valve in the one hydraulic circuit are separately provided in a primary base body and a secondary base body, and the primary base body and the secondary base body are separated from each other, wherein the intermediate section of the primary channel in the one hydraulic circuit is formed in the primary base body, wherein the intermediate section of the primary channel and the first valve in the one hydraulic circuit communicate with each other via a first partial channel formed in the primary base body and a second partial channel formed in the secondary base body, the suction side of the pump in the secondary channel and the second valve in the supply channel in the one hydraulic circuit communicate with each other via a third partial channel formed in the primary base body and a fourth partial channel formed in the secondary base body, the first partial channel is connected to the second partial channel via a first brake fluid pipe, and the third partial channel is connected to the fourth partial channel via a second brake fluid pipe.

2. A brake system for a motorcycle comprising:
the brake hydraulic pressure control unit according to claim 1.

3. A motorcycle comprising:
the brake system for a motorcycle according to claim 2.

4. A brake hydraulic pressure control unit of a brake system for a motorcycle, the brake system including:
a first hydraulic circuit acting on a front wheel of the motorcycle; and
a second hydraulic circuit acting on a rear wheel of the motorcycle,
the first hydraulic circuit including:
a primary channel communicating between a master cylinder of the first hydraulic circuit and a wheel cylinder of the first hydraulic circuit; and
a secondary channel releasing a brake fluid in the wheel cylinder of the first hydraulic circuit to an intermediate section of the primary channel of the first hydraulic circuit by driving a pump, the second hydraulic circuit including:
a primary channel communicating between a master cylinder of the second hydraulic circuit and a wheel cylinder of the second hydraulic circuit; and
a secondary channel releasing a brake fluid in the wheel cylinder of the second hydraulic circuit to an intermediate section of the primary channel of the second hydraulic circuit by driving a pump, and one hydraulic circuit of the first hydraulic circuit and the second hydraulic circuit being a boost-type hydraulic circuit capable of boosting a pressure of the brake fluid in the wheel cylinder by driving the pump, and including a supply channel through which the brake fluid in the master cylinder is supplied to a suction side of the pump in the secondary channel, the brake hydraulic pressure control unit comprising:

an inlet valve provided in the primary channel of the first hydraulic circuit;

an inlet valve provided in the primary channel of the second hydraulic circuit;

an outlet valve provided in the secondary channel of the first hydraulic circuit;

an outlet valve provided in the secondary channel of the second hydraulic circuit;

a first valve provided on the master cylinder side of the intermediate section of the primary channel in the one hydraulic circuit; and a second valve provided in the supply channel in the one hydraulic circuit, wherein the inlet valve, the outlet valve, and the pump in the one hydraulic circuit and the first valve and the second valve in the one hydraulic circuit are separately provided in a primary base body and a secondary base body, and the primary base body and the secondary base body are separated from each other, wherein of the first hydraulic circuit and the second hydraulic circuit, the other hydraulic circuit is not the boost-type hydraulic circuit capable of boosting the pressure of the brake fluid in the wheel cylinder of the other hydraulic circuit by driving the pump of the other hydraulic circuit, and the secondary base body is provided with a master cylinder hydraulic pressure sensor that detects a pressure of the brake fluid in the master cylinder in the other hydraulic circuit.

5. The brake hydraulic pressure control unit according to claim 4, wherein
the primary base body is provided with the inlet valve, the outlet valve, and the pump in the other hydraulic circuit.

6. A brake system for a motorcycle comprising:
the brake hydraulic pressure control unit according to claim 4.

7. A motorcycle comprising:
the brake system for a motorcycle according to claim 6.

8. The brake hydraulic pressure control unit according to claim 4, wherein
the intermediate section of the primary channel and the first valve in the one hydraulic circuit communicate with each other via a first partial channel formed in the primary base body and a second partial channel formed in the secondary base body, the suction side of the pump in the secondary channel and the second valve in the supply channel in the one hydraulic circuit communicate with each other via a third partial channel formed in the primary base body and a fourth partial channel formed in the secondary base body,
the first partial channel is directly connected to the second partial channel, and
the third partial channel is directly connected to the fourth partial channel.

9. A brake hydraulic pressure control unit of a brake system for a motorcycle, the brake system including:
a first hydraulic circuit acting on a front wheel of the motorcycle; and
a second hydraulic circuit acting on a rear wheel of the motorcycle,
the first hydraulic circuit including:
a primary channel communicating between a master cylinder of the first hydraulic circuit and a wheel cylinder of the first hydraulic circuit; and
a secondary channel releasing a brake fluid in the wheel cylinder of the first hydraulic circuit to an intermediate section of the primary channel of the first hydraulic circuit by driving a pump,
the second hydraulic circuit including:
a primary channel communicating between a master cylinder of the second hydraulic circuit and a wheel cylinder of the second hydraulic circuit; and
a secondary channel releasing a brake fluid in the wheel cylinder of the second hydraulic circuit to an intermediate section of the primary channel of the second hydraulic circuit by driving a pump, and
one hydraulic circuit of the first hydraulic circuit and the second hydraulic circuit being a boost-type hydraulic circuit capable of boosting a pressure of the brake fluid in the wheel cylinder by driving the pump, and including a supply channel through which the brake fluid in the master cylinder is supplied to a suction side of the pump in the secondary channel,
the brake hydraulic pressure control unit comprising:
an inlet valve provided in the primary channel of the first hydraulic circuit;
an inlet valve provided in the primary channel of the second hydraulic circuit;
an outlet valve provided in the secondary channel of the first hydraulic circuit;
an outlet valve provided in the secondary channel of the second hydraulic circuit;
a first valve provided on the master cylinder side of the intermediate section of the primary channel in the one hydraulic circuit; and
a second valve provided in the supply channel in the one hydraulic circuit, wherein
the inlet valve, the outlet valve, and the pump in the one hydraulic circuit and the first valve and the second valve in the one hydraulic circuit are separately provided in a primary base body and a secondary base body, and
the primary base body and the secondary base body are separated from each other, wherein
only the second hydraulic circuit is the boost-type hydraulic circuit capable of boosting the pressure of the brake fluid in the wheel cylinder of the second hydraulic circuit by driving the pump of the second hydraulic circuit.

10. The brake hydraulic pressure control unit according to claim 9, wherein
the master cylinder in the second hydraulic circuit receives an operation of a foot pedal of the motorcycle, and
the secondary base body is disposed closer to the foot pedal in comparison with the primary base body.

11. A brake system for a motorcycle comprising:
the brake hydraulic pressure control unit according to claim 9.

12. A motorcycle comprising:
the brake system for a motorcycle according to claim 11.

13. The brake hydraulic pressure control unit according to claim 9, wherein
the intermediate section of the primary channel and the first valve in the one hydraulic circuit communicate with each other via a first partial channel formed in the primary base body and a second partial channel formed in the secondary base body,
the suction side of the pump in the secondary channel and the second valve in the supply channel in the one hydraulic circuit communicate with each other via a third partial channel formed in the primary base body and a fourth partial channel formed in the secondary base body,
the first partial channel is directly connected to the second partial channel, and
the third partial channel is directly connected to the fourth partial channel.

* * * * *